(12) United States Patent
Katzenberger et al.

(10) Patent No.: US 9,229,959 B2
(45) Date of Patent: Jan. 5, 2016

(54) OBJECT GRAPH PARTIAL IMMUTABILITY AND ISOLATION ENFORCEMENT

(71) Applicant: Microsoft Corporation, Redmond, WA (US)

(72) Inventors: G. Shon Katzenberger, Fall City, WA (US); Jared Porter Parsons, Kirkland, WA (US); Alexander Daniel Bromfield, Seattle, WA (US); John J. Duffy, Seattle, WA (US); Krzysztof J. Cwalina, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 13/734,758

(22) Filed: Jan. 4, 2013

(65) Prior Publication Data

US 2014/0195563 A1 Jul. 10, 2014

(51) Int. Cl.
*G06F 17/30* (2006.01)
*G06F 9/52* (2006.01)

(52) U.S. Cl.
CPC ............ *G06F 17/30286* (2013.01); *G06F 9/52* (2013.01)

(58) Field of Classification Search
CPC ............ G06F 21/6227; G06F 21/6236; G06F 21/6254; G06F 21/6263; G06F 21/6218; G06F 17/30067; G06F 17/30286; G06Q 10/10
USPC ........................................................ 707/781
See application file for complete search history.

(56) References Cited

U.S. PATENT DOCUMENTS

| | | | |
|---|---|---|---|
| 5,701,458 A * | 12/1997 | Bsaibes et al. | ........... 1/1 |
| 6,438,560 B1 | 8/2002 | Loen | |
| 6,510,460 B1 | 1/2003 | Callsen et al. | |
| 6,675,378 B1 | 1/2004 | Schmidt | |
| 6,925,638 B1 | 8/2005 | Koved et al. | |
| 7,058,943 B2 | 6/2006 | Blais et al. | |
| 7,096,456 B2 | 8/2006 | Hanson et al. | |
| 7,603,664 B2 | 10/2009 | Dutt et al. | |
| 7,739,466 B2 | 6/2010 | Rozas et al. | |
| 7,774,376 B1 | 8/2010 | Meijer et al. | |
| 7,912,863 B1 | 3/2011 | Meijer et al. | |
| 7,921,143 B2 | 4/2011 | Dussud et al. | |
| 8,132,093 B2 | 3/2012 | Lammel et al. | |
| 8,141,063 B2 | 3/2012 | Foley | |
| 8,281,293 B2 | 10/2012 | Fulton et al. | |
| 8,282,293 B2 | 10/2012 | Ono | |
| 8,321,632 B2 | 11/2012 | Revanuru | |
| 8,347,266 B2 | 1/2013 | Meijer et al. | |

(Continued)

OTHER PUBLICATIONS

Finifter et al., "Verifiable functional purity in Java", Proceedings of the 15th ACM Conference on Computer and Communications Security, CCS 2008, Oct. 31, 2008, p. 161.

(Continued)

*Primary Examiner* — Cam-Y Truong
(74) *Attorney, Agent, or Firm* — John Jardine; Aaron Hoff; Micky Minhas

(57) ABSTRACT

The type definition of particular types such that different portions of the corresponding object graph may have different permissions assigned to those portions during instantiation. This allows structured permissions to be applied to instantiations of the object graphs of those defined types, allowing fine grained control over what access permissions are enforced against which portions of the object graph. In some embodiments, different instantiations of the object graph may apply permissions differently.

20 Claims, 5 Drawing Sheets

(56) References Cited

U.S. PATENT DOCUMENTS

| | | | |
|---|---|---|---|
| 8,527,946 B2 | 9/2013 | Vaziri-Farahani et al. | |
| 8,533,413 B2 | 9/2013 | Brunswig et al. | |
| 8,589,951 B2 | 11/2013 | Krishnamurthy et al. | |
| 2006/0036570 A1 | 2/2006 | Schaefer et al. | |
| 2006/0036656 A1 | 2/2006 | Mercer | |
| 2007/0056042 A1* | 3/2007 | Qawami et al. | 726/26 |
| 2007/0203960 A1 | 8/2007 | Guo | |
| 2008/0010451 A1* | 1/2008 | Holtzman et al. | 713/158 |
| 2008/0244516 A1 | 10/2008 | Meijer et al. | |
| 2008/0270482 A1 | 10/2008 | Hillberg et al. | |
| 2008/0294685 A1 | 11/2008 | Johnson | |
| 2009/0083348 A1 | 3/2009 | Johnson | |
| 2009/0327999 A1 | 12/2009 | Duffy et al. | |
| 2010/0037212 A1 | 2/2010 | Meijer et al. | |
| 2010/0115203 A1 | 5/2010 | White | |
| 2010/0257206 A1* | 10/2010 | Brown et al. | 707/784 |
| 2010/0262801 A1 | 10/2010 | Duffy et al. | |
| 2010/0275191 A1* | 10/2010 | Duffy et al. | 717/150 |
| 2011/0161610 A1 | 6/2011 | Gustafsson et al. | |
| 2011/0320734 A1 | 12/2011 | Revanuru | |
| 2013/0007703 A1 | 1/2013 | Auerbach et al. | |

OTHER PUBLICATIONS

Mettler et al., "The Joe-E Language Specification, Version 1.0 (Technical Report No. UCB/EECS-2008-91)", Aug. 2008, retrieved from the Internet at: <<http://www.eecs.berkeley.edu/Pubs/TechRpts/2008/EECS-2008-91.pdf>>.
Birka et al., "A practical type system and language for reference immutability", Proceedings of the 19th Annual ACM SIGPLAN Conference on Object-Oriented Programming, Systems, Languages, and Applications, OOPSLA 2004, vol. 39, Oct. 2004, p. 35.
U.S. Appl. No. 13/734,750, filed Jan. 4, 2013, Duffy et al.
U.S. Appl. No. 13/734,762, filed Jan. 4, 2013, Parsons et al.
Office Action dated May 23, 2014 cited in U.S. Appl. No. 13/734,762.
Office Action dated May 23, 2014 cited in U.S. Appl. No. 13/734,750.
Hawblitzel, et al., "Type System Support for Dynamic Revocation", In Second Workshop on Compiler Support for System Software, May 6, 2010, 10 pages.
Naden, et al., "A Type System for Borrowing Permissions", in 39th Annual ACM SIGPLAN-SIGACT Symposium on Principles of Programming Languages, Jan. 25, 2012, 14 pages.
Zhou, et al., "SafeDrive: Safe and Recoverable Extensions Using Language-Based Techniques", Retrieved on: Nov. 26, 2012, Available at: https://131.106.3.253/events/osdi06/tech/full_papers/zhou/zhou.pdf.
Srinivasan, et al., "Kilim: Isolation-Typed Actors for Java", in ECOOP—Object-Oriented Programming, Lecture Notes in Computer Science , vol. 5142, 25 pages.
U.S. Appl. No. 12/649,252, Gustafsson, et al., "Compiler-Enforced Agent Access Restriction", filed Dec. 29, 2009.
U.S. Appl. No. 12/429,874, Duffy, et al., "Concurrent Mutation of Isolated Object Graphs", filed Apr. 24, 2009.
U.S. Appl. No. 12/422,764, Duffy, et al., "Type System Support for Memory Isolation Permissions", filed Apr. 13, 2009.
U.S. Appl. No. 12/163,868, Duffy, et al., "Immutable Types in Imperitive Language", filed Jun. 27, 2008.
U.S. Appl. No. 13/652,436, Bromfield, et al., "Expc: Inferring Uniqueness and Immutability from Expression Inputs", filed Oct. 15, 2012.
Khodorkovsky, Daniel, "A Summary of AliasJava and Some Related Works", Published on: Dec. 10, 2002, http://www.cs.umd.edu/class/fall2002/cmsc631/notes/khodod.pdf.
Bjarne Stroustrup, "The C++ Programming Language, Third Edition—Chapter 10: Classes, Chapter 14: Exceptions, Section C.9: Memory Management", The C++ Programming Language, Third Edition, Jun. 1997, Addison Wesley, 80 pages.

Herbert Schildt, "C# 3.0: The Complete Reference (excerpt: pp. 607-608)", in C+3.0: The Complete Reference, Dec. 2008, McGraw Hill, 18 pages.
Ecma International, "ECMA-334: C# Language Specification, 4th Edition (excerpt: pp. 247-249)", Jun. 2006, Available at <<http://www.ecma-international.org/publications/filed/ECMA-ST/Ecma-334.pdf>>.
Dillig, et al., "The Closer: Automating Resource Management in Java", In Proceedings of the 7th International Symposium on Memory Management, Jun. 7, 2008, 10 pages.
Chow, et al., "Understanding Data Lifetime via Whole System Simulation", In Proceedings of the 13th Conference on USENIX Security Symposium , Aug. 9, 2004, 16 pages.
"ResourceDictionary and StaticResource References (Windows Store apps using C#/VB/C++ and XAML) (Windows)", Retrieved on: Jan. 29, 2013, Available at: http://msdn.microsoft.com/en-in/library/windows/apps/hh968442.aspx.
Gordon, et al.,"Uniqueness and Reference Immutability for Safe Parallelism" In Proceedings of the ACM international conference on Object oriented programming systems languages and applications, Oct. 19, 2012, 20 pages.
Castegren, Elias"LAPS: A General Framework for Modeling Alias Management Using Access Permission Sets", In Proceedings of Master of Science Programme in Information Technology Engineering, Oct. 2012, 93 pages.
Balzer, et al.,"Selective Ownership: Combining Object and Type Hierarchies for Flexible Sharing", In Proceedings of FOOL 2012: 19th International Workshop on Foundations of Object-Oriented Language, Oct. 22, 2012, 10 pages.
U.S. Appl. No. 13/652,436, Duffy, et al., Expc: Inferring Uniqueness and Immutability from Expression Inputs, filed Oct. 15, 2012.
Khodorkovsky, Daniel, "A Summary of AliasJava and Some Related Works", Published on: Dec. 10, 2002, Available at: http://www.cs.umd.edu/class/fall2002/cmsc631/notes/khodod.pdf.
"D Programming Language: Change Log", Available at least as early as Jan. 2012, 74 pages. Available at <<https://web.archive.org/web/20120110201529/http:/dlang.org/changelog.html>>.
D Programming Language: Attributes, Available at least as early as Apr. 2012, 8 pages. Available at <<https://web.archive.org/web/20120402231813/http:/dlang.org/attribute>>.
D Programming Language: Const and Immutable, Available at least as early as Jan. 2012, 6 pages. Available at <<https://web.archive.org/web/20120110201814/http:/dlang.org/const3.html>>.
Cehreli, Ali, "Programming in D: Learn to program in the D programming language", D.ershane Series, Available at least as early as Apr. 2012, 332 pages. Available at <<https://web.archive.org/web/20120514174625/http:/ddili.org/ders/d.en/Programming_in_D.pdf>>.
Zibin, et al., "Object and Reference Immutability using Java Generics", In Proceedings of the 6th Joint Meeting of the European Software Engineering Conference and the ACM SIGSOFT Symposium on the Foundations of Software Engineering, Sep. 3, 2007, 10 pages.
International Search Report & Written Opinion for PCT Patent Application No. PCT/US2014/010117, Mailed Date: Mar. 21, 2014, Filed Date: Jan. 3, 2014, 9 Pages.
International Search Report & Written Opinion for PCT Patent Application No. PCT/US2014/010112, Mailed Date: Apr. 3, 2014, Filed Date: Jan. 3, 2014, 11 Pages.
International Search Report & Written Opinion for PCT Patent Application No. PCT/US2014/010118, Mailed Date: Apr. 8, 2014, Filed Date: Jan. 3, 2014, 8 Pages.
Notice of Allowance dated Jan. 20, 2015 cited in U.S. Appl. No. 13/734,750.
Office Action dated Jan. 30, 2015 cited in U.S. Appl. No. 13/734,762.
Notice of Allowance dated Mar. 26, 2015 cited in U.S. Appl. No. 13/734,750.

* cited by examiner

OBJECT GRAPH PARTIAL IMMUTABILITY AND ISOLATION ENFORCEMENT

BACKGROUND

Computing systems obtain a high degree of functionality by executing software programs. Programs consist of computer-executable instructions that are kept in some persistent form, such as on a harddrive, a compact disk, a thumbdrive, flash memory, or the like. During execution, such computer-executable instructions may often be loaded in random access memory, and executed by one or more processors of the computing system, causing the computing system to perform tasks.

In object-oriented programming, these computer-executable instructions are organized into objects that interact through function calls, and that may have one or more properties. Managed code is code that runs in a managed environment that provides type safety, but may also provide memory management and exception handling. In managed code, objects have unbounded lifetimes, no restriction on storage, and methods of access restriction involve indirection or extra resources.

Systems level programming is based upon tight and efficient management of access to and lifetime of resources (such as objects) throughout the system. One common way to provide this tight management is to use an Application Program Interface (API) to manage the lifetime and access of the resource.

BRIEF SUMMARY

At least some embodiments described herein relate to the type definition of particular types such that different portions of the corresponding object graph may have different permissions assigned to those portions during instantiation, which permission is are maintained during a lifetime of each instance of the type, though in some embodiments, the permission may weaken during the lifetime of at least some instances of the type. This allows structured permissions to be applied to instantiations of the object graphs of those defined types, allowing fine grained control over what access permissions are enforced against which portions of the object graph. In some embodiments, different instantiations of the object graph may apply permissions differently.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a language extension is provided such that different portions of the corresponding object graph may have different permissions assigned to those portions during instantiation, which permissions are maintained during a lifetime of each instance of the type, though in some embodiments, the permission may weaken during the lifetime of at least some instances of the type. This allows structured permissions to be applied to instantiations of the object graphs of those defined types, allowing fine grained control over what access permissions are enforced against which portions of the object graph. In some embodiments, different instantiations of the object graph may apply permissions differently.

Some introductory discussion of a computing system will be described with respect to FIG. 1. Then, the principles of a managed code system will be described with respect to FIG. 2. Finally, the principles of the language extension to declare structured permissions will be described with respect to FIGS. 3 through 6.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
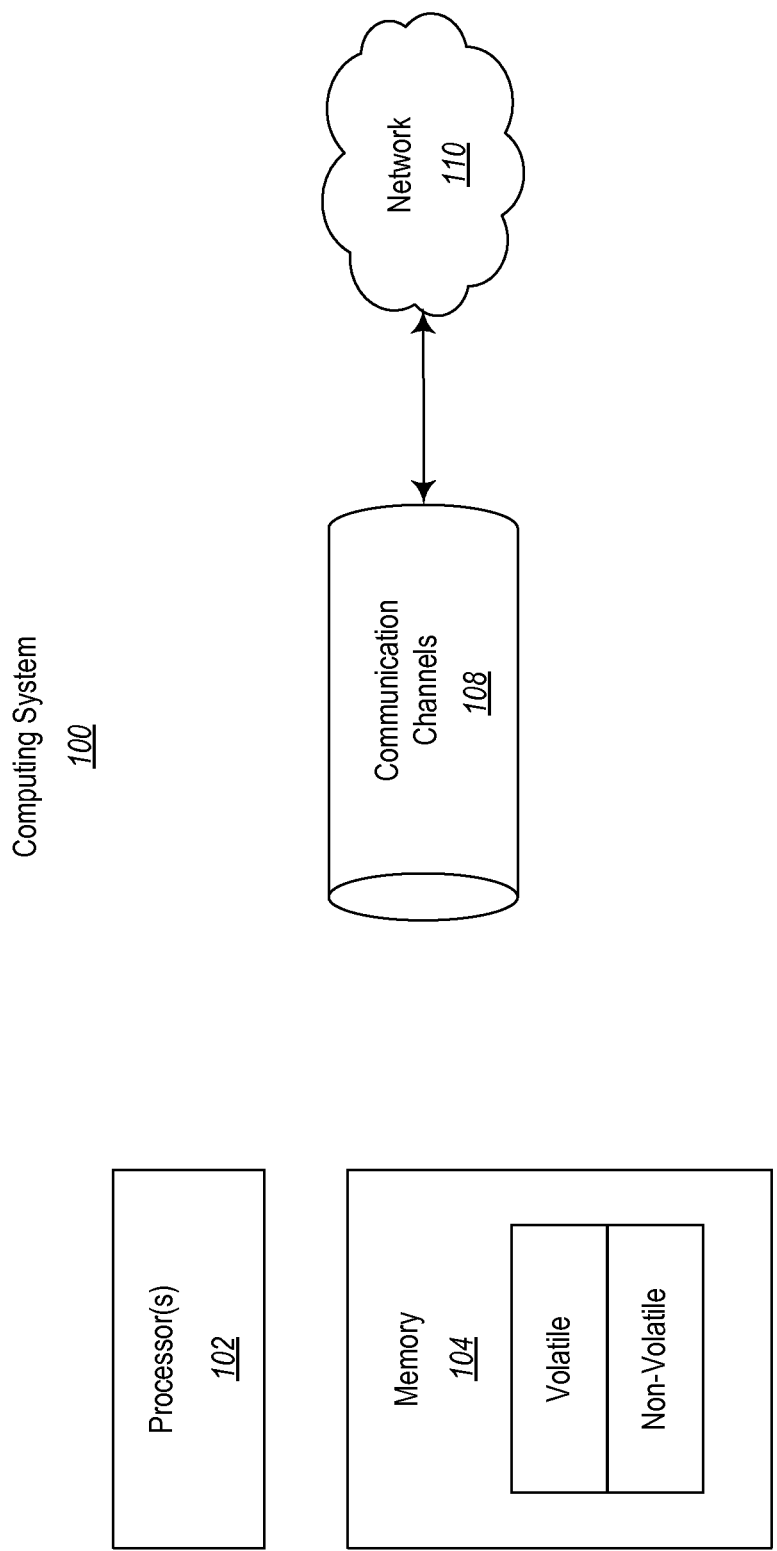
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
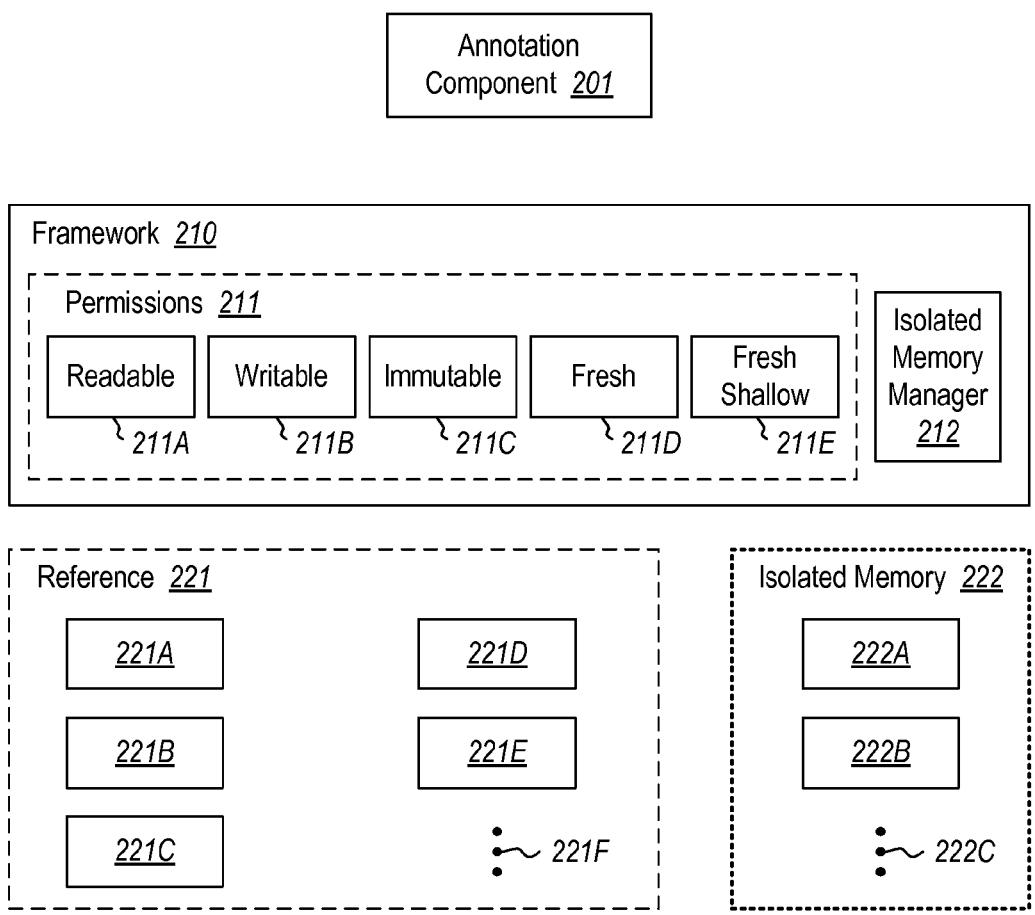
FIG. 2 abstractly illustrates a managed code system that represents an example environment in which the embodiments described herein may be employed.

FIG. 2 illustrates an environment 200 in which the principles described herein may operate. The environment 200 includes framework 210 that tracks the isolation and mutability of object graphs. The framework 210 organizes various references 221 to object graphs by controlling access to the reference. A reference may be a local variable, a method parameter, an object field, or any other reference to an object graph. In the illustrated embodiment, references 221 are illustrated as including references 221A through 221E, although the ellipses 221F symbolically represent that the framework 210 may manage access to any number of references 220.

The framework 210 manages access to the references 221 by assigning permissions to the references. A "permission" is an annotation on a reference which indicates some property about whether the reference can be mutated. Such permissions are abstractly represented by permissions 211 in FIG. 2. The permissions include readable permissions 211A, writable permissions 211B and immutable permissions 211C.

The "readable" permission 211A means that the corresponding object (and all of its fields, and all of its field's fields, and so forth) may only be read from.

The "writable" permission 211B means that the corresponding object may be written to.

The "immutable" permission 211C is like the readable permission 211A, but further guarantees that no one else has a writable reference to this object. The immutable permission 211C may further guarantee that there will never again be a writable reference to this object. Thus, an immutable permission 211C means that the corresponding object will never be written to, and similarly all of its fields, and all of its field's fields, and so forth, will never be written to. All static fields in an object are treated as having the immutable permission 211C by the framework 210.

The "fresh" permission 211D signifying that 1) there are no external references to the particular object graph (or any object within the particular object graph) referenced by the returned reference, and 2) there are no mutable references within the object graph to any objects outside of the object graph. The "fresh shallow" permission 211E will be described in further detail below.

The framework 210 also includes an isolated memory manager 212 which annotates memory locations as being isolated. The "isolated" annotation on a storage location means that the location stores a value which is externally unique. That is, for any object stored in that location, there are no external references to that object in the system, nor are there any references to any of the object's fields, or any fields of its fields, and so on. For instance, isolated memory manager 212 manages isolated memory locations 222. The isolated memory locations are illustrated as including two isolated memory locations 222A and 222B, though the ellipses 222C represents that the isolated memory locations 222 may include any number of isolated memory locations.

An annotation component 201 is built upon the framework 210. Alternatively or in addition, the annotation component 201 may operate as part of the framework 210. The annotation component 201 is configured to evaluate an executable component that returns a reference, such as one of the references 221 of FIG. 2.

Often, permissions on an object are deep permissions, meaning the permission attached to the reference applies deeply to all reachable objects from the root reference. However, this does not help to protect parts of an object graph from mutation while allowing mutations to others. Most notably is the idea of having collections where elements cannot be added or removed, but the elements themselves can be mutated by an invoked function.

Today this is achieved by use of interfaces which prevent mutation, or by having a wrapper collection type which only provides access to the desired functions on the root collection. Neither of these solutions is optimal for systems programming. The use of interfaces can be subverted by casting back to the original collection type. The use of a wrapper type adds both an allocation and indirection overhead that can be unacceptable in tight loops.

Figure 3:
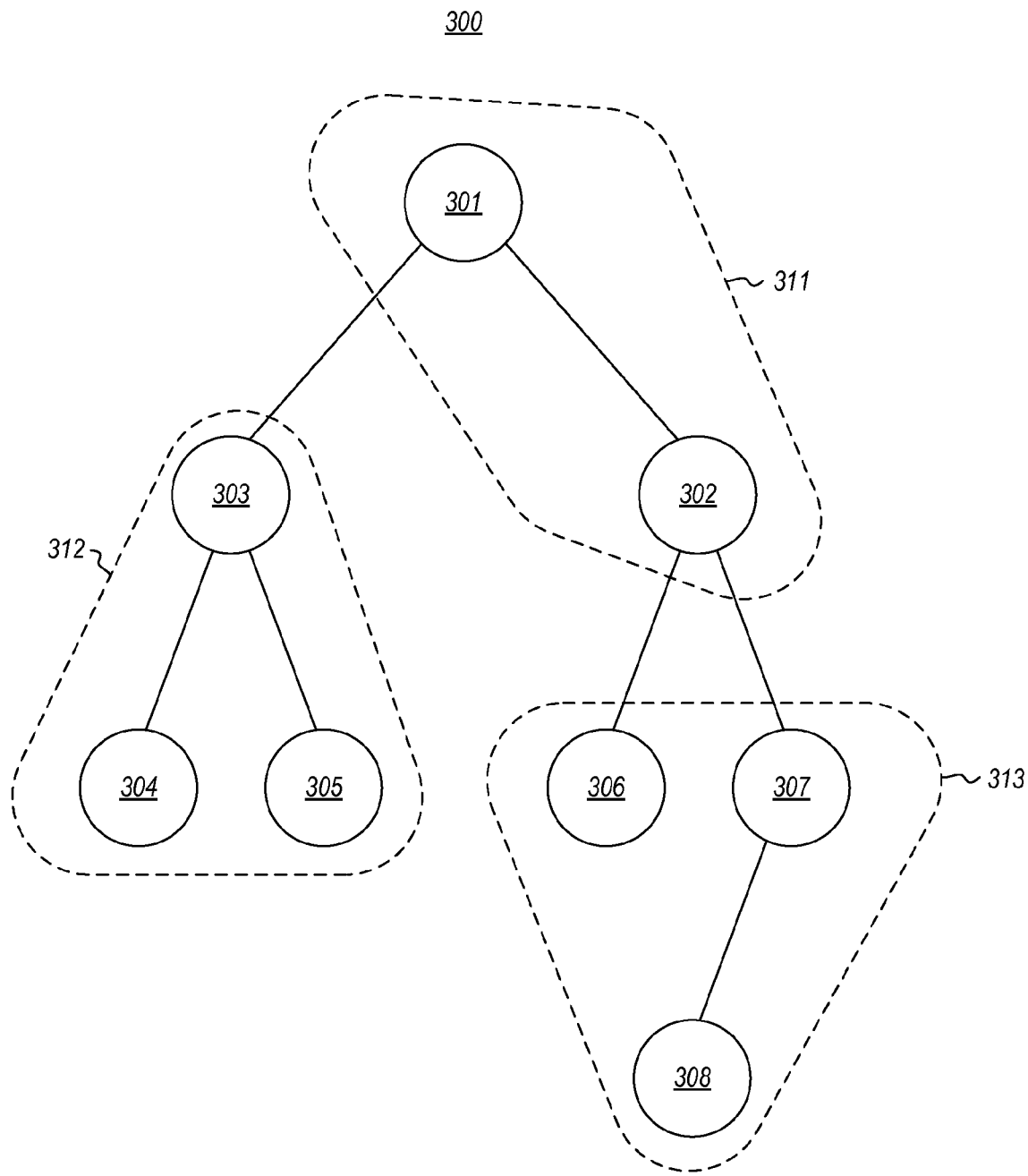
FIG. 3 illustrates an example object graph having structured permissions.

In accordance with the principles described herein, an object graph may be divided into different partitions to which permissions are allowed to be individually attached. An object graphs may be of an infinite variety of forms, and the principles described herein are not limited to the particular form of the object graph. However, for purposes of illustration only, FIG. 3 illustrates an object graph as including 8 objects including a root object 301 and seven other objects 302 through 308. In this particular example, there are three permission partitions 311, 312 and 313. Each portion 311, 312 and 313 includes a subset of the objects within the object graph. For instance, permission partition 311 includes objects 301 and 302, permission partition 312 includes objects 303 through 305, and permission partition 313 includes objects 306 through 308. Different permissions may be assigned individually to each of the portions 311, 312 and 313, such that a permission assigned to any of the permission partitions may be different than a permission assigned to any of the other permission partitions.

Permission partitions that contain the root object will also be referred to herein as the "root permission partition" whereas other permission partitions will also be referred to herein as "inner permission partitions". For instance, referring to FIG. 3, the permission partition 311 is a root permission partition, whereas permission partitions 312 and 313 are inner permission partitions.

Although the example above shows an object graph that includes three permission partitions, the principles described herein also apply for defining objects with two permission partitions. For instance, the object graph might have a first permission partition represented by objects 301 and 302, and a second permission partition represented by objects 303 through 308. That said, the principles described herein apply also to situations in which an instance of a type is an object graph having four or more permission partitions also. In other words, the principles described herein are simply not constrained by the exact form of the object graph, nor how many permission partitions the object graph is divided into, nor how the object graph is divided into permission partitions. In this description and in the claims, a type is said to have a "structured permission" if the type definition has multiple permission partitions to which permissions may be individually assigned.

Figure 4:
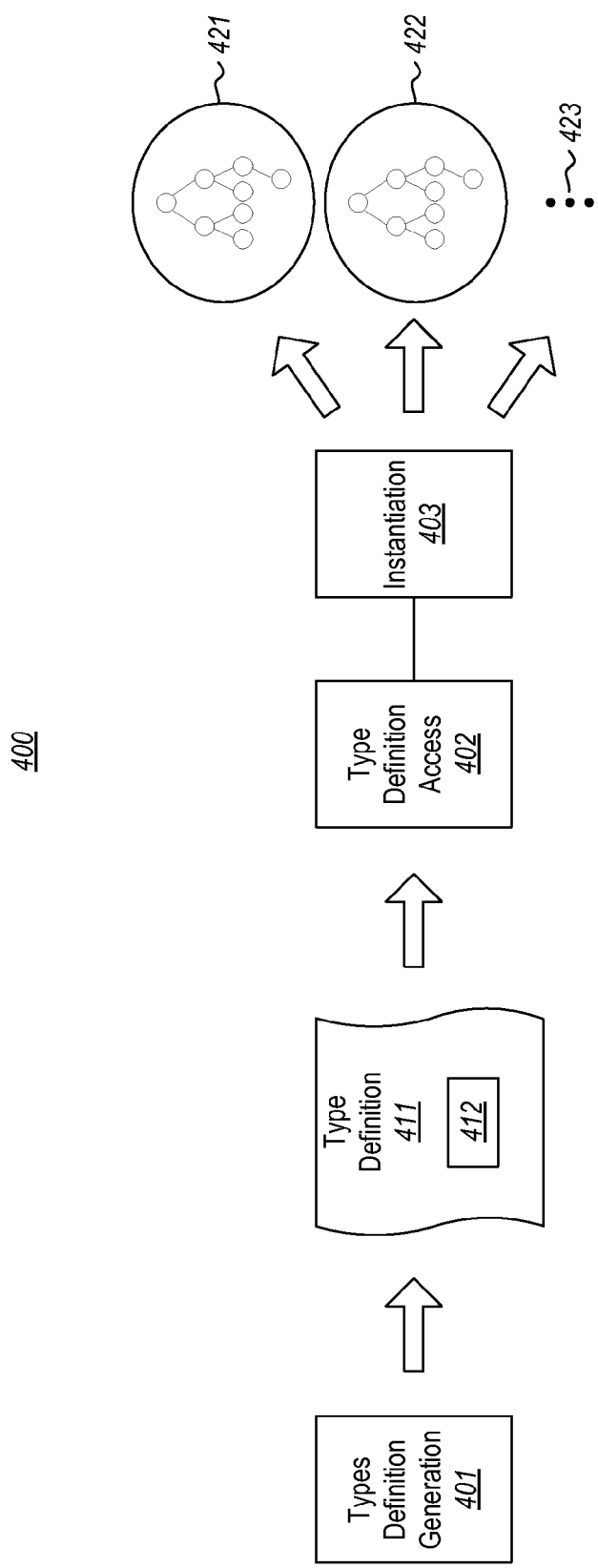
FIG. 4 illustrates an environment in which a type definition having structured definitions may be generated and instantiated.

FIG. 4 illustrate a system 400 that includes a type definition generation component 401, a type definition access component 402, and an instantiation component 403.

The type definition generation component 401 generates a type definition 411 that includes a structured permission 412. As an example, the type definition generation component 401 might be a component of authoring software, or might be a component of software that automatically generates code, such as source code, intermediate code, or machine code.

A type definition access component 402 accesses the type definition 411 that includes the structured permission 412. For instance, the type definition 411 might corresponds to the object graph 300 of FIG. 3 and include the three permission partitions 311 through 313.

An instantiation component 403 generates object graphs of the particular type using the type definition accessed by the type definition access component 402. For instance, the instantiation component 403 instantiates object graphs 421 and 422, although the instantiation component 403 may instantiate any number of object graphs of the particular object type as represented by the ellipses 423. In the process of generating the object graphs, the instantiation component assigns permissions to the various permission partitions of each object graph.

Figure 5:
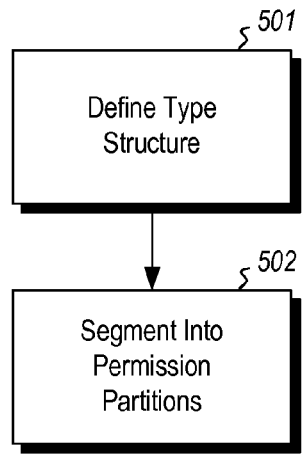
FIG. 5 illustrates a flowchart a method for generating a type definition have structured permissions.

FIG. 5 illustrates a flowchart of a method 500 for declaring a type that may have a structured permission. The method 500 may be performed by, for example, the type definition generation component 401 of FIG. 4. The method includes defining the type structure (act 501), and also segmenting the type structure into permission partitions (act 502). Although acts 501 and 502 are shown sequentially, there may be no temporal relationship between the performance of the acts in that they may even occur concurrently.

For instance, referencing FIG. 3, the object graph 300 shows the type structure, which may be defined by the type definition 411 of FIG. 4. In the case of FIG. 3, segmenting the type structure into permission partitions includes defining the first permission partition 311, defining the second permission partition 312, and defining the third permission partition 313. The result is the structured permission 412 included within the type definition 411 of FIG. 4. Note again that each permission partition may be individually assigned a permission, such that the second permission partition 312 may (but need not) have a different permission that the first permission partition 311 or the third permission partition 313. Likewise, the third permission partition 313 may (but need not) have a different permission that the first permission partition 311 or the second permission partition 312.

A specific example of formulating a type definition with a structured permission will now be described. In the following pseudo-code example, the structured permission is formed by attaching the keyword "contains" to a type parameter or permission parameter in a type definition. All fields of this type represent a different data partition. These are referred to as inner permission partitions and their permission as inner permissions. The "this" permission and its associated data is referred to as the root permission and root permission partition. Consider the following pseudo-code example:

```
class Container<contains typepermission T>
{
   bool m_hasValue;
   T m_value;
   T GetValue( ) readable
   {
      return m_value;
   }
   void SetValue(T value)
   {
      m_value = value;
   }
}
```

In the above example, the type of field m_value is T and hence represents a separate data partition. The type of the field m_hasValue is bool and hence is a part of the root partition. Even though the permission on "this" is readable in the GetValue method, the type of m_value remains simply T. This type does not have a defined permission and hence the body of GetValue cannot mutate the contents but it can return it with the permission unchanged.

Figure 6:
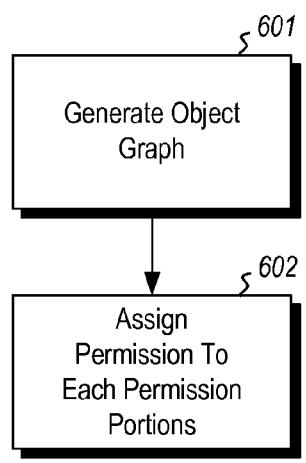
FIG. 6 illustrates a flowchart of a method for instantiating an object graph having structured permissions.

FIG. 6 illustrates a method 600 for instantiating an object graph representing an instance of a particular type that has structured permissions. The method 600 may be performed by, for example, the instantiation component 403 of FIG. 3 using the type definition 411 accessed by the type definition access component 402. This method 600 may, for example, be performed for each instantiation of object graph 421 and object graph 422.

The method 600 includes generating the object graph 601 in accordance with the type definition (act 601), and also assigning a permission to each permission partition of the object (act 602) so that the respective permission is enforced on access requests for objects within the first permission partition. Although acts 601 and 602 are shown sequentially, there may be no temporal relationship between the performance of the acts in that they may even occur concurrently.

Because the permissions are individually assigned, they may be the same as the permissions assigned to other permission partitions within the same object graph, or they may be different than other permission partitions within the same object graph. For instance, in instance 421 of the object graph 300, the first permission of the first permission partition 311 might be immutable, writable or readable; the second permission of the second permission partition 312 might be immutable, writable or readable; and the third permission of the second permission partition 313 might be immutable, writable or readable.

For instance, in the above pseudo-code example, the consumers of Container can specify the permission of the inner permission partition to be different than that of the root permission partition. This is done by specifying a different permission in the generic instantiation of the type as follows: readable Container<writable Widget> container;

Here the root permission partition is annotated with readable and cannot be mutated. It disallows access to methods like SetValue which requires writable. The inner permission partition itself is writable and hence the values stored in that permission partition can be mutated. Consider the following pseudo-code example:

```
writable Widget widget = container.GetValue( );
widget.Name = "New Widget";
```

In the same way that objects with deep permissions can be converted to an instance with a more restrictive permissions, so too can objects with structured permissions. Consider the following pseudo-code example:

```
writable Container<writable Widget> container = ...;
readable Container<writable Widget> readonlyContainer = container;
readable Container<readable Widget> deepReadableContainer = container;
```

In this example, the readonlyContainer has a less permissive permission than container. It allows the elements to be mutated but does not allow for direct mutation of the container. The reverse is not true, it would be an error to attempt to assign readonlyContainer to container. In fact, conversions are permitted whenever the permission on the target is more restrictive than the source. For instance, readable<writable> is more restrictive than writable<writable>, and thus conversion from a source of writable<writable> to a target of readable<writable> is permitted. Furthermore, readable<readable> is more restrictive than readable<writable>, and thus conversion from a source of readable<writable> to a target of readable<readable> is permitted. However, writable<readable> is more permissive than writable<writable> hence conversions of this kind are not allowed.

The above pseudo-code example illustrates that multiple instances of the same type can be generated, but the permissions assigned to the various permission partitions need not be the same. For example, consider a first instance 421 of the object graph 300, and a second instance 422 of the object graph 300. The first permission assigned to the first permission partition 311 for the first instance 421 need not be the same as the first permission assigned to the first permission partition 311 of the second instance 422. Likewise, the second permission assigned to the second permission partition 312 for the first instance 421 need not be the same as the second permission assigned to the second permission partition 312 of the second instance 422.

The use of permissions here does not require additional runtime overhead, nor extra types, nor added indirection, and no allocation is required. The use of permissions cannot be subverted with a cast to the original type because the type system forbids casting from making permissions more permissive. The protection is simply guaranteed at compile time.

This design also allows for types with partial immutability. This occurs when any of the permission partitions on a type are tagged with the immutable partition. A type where all partitions are tagged with immutable is said to be deeply immutable. Consider the following pseudo-code example

```
immutable Container<writable Widget> container 1;
writable Container<immutable Widget> container2;
immutable Container<immutable Widget> container3;
```

In the above example, both container1 and container2 are partially immutable. The former has an immutable root permission partition while the latter has a writable root permission partition but contains immutable data. The final definition has all permission partitions labeled as immutable and is a deeply immutable value.

The building up of partially immutable root containers is similar to that of deeply immutable containers. Referring to FIG. 2, the fresh permission 211D applies with respect to a root object if 1) that there are no external references to the root object graph referenced by the return reference, and 2) that there are no mutable references within the root object from to any objects outside of the root object. That value can be stored in an isolated location, slowly built up over time and realized into an immutable value.

Referring again to FIG. 2, there is a special shallow fresh permission 211E which denotes that the root permission partition only has no external references. This permission is applicable to a root permission partition when, 1) that there are no external references to the root permission partition referenced by the return reference, and 2) that there are no mutable references within the root permission partition to any objects outside of the root permission partition. Just like the fresh value, the shallow fresh value can be converted to any permission. However this can only be done for the root permission partition. The shallow fresh permission 211E has no effect on the inner permission partitions. The shallow fresh value can also be stored in a unique location.

Accordingly, an effective mechanism for defining types having structured permissions, and instantiating objects according to those types, has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage memory having thereon computer-executable instructions that, when executed by one or more processors of a computing system, cause the computing system to perform a method for declaring a type that can have a structured permission, the method comprising:
   representing a type as an object graph, the object graph comprising a plurality of nodes, the object graph supporting structured permissions, the structured permissions comprising a plurality of distinct permissions including a fresh permission, a fresh shallow permission, a deep permission, a root permission, and an inner permission;
   defining a first permission partition within the type, the first permission partition comprising a first set of one or more nodes within the plurality of nodes of the object graph;
   defining a second permission partition within the type, the second permission partition comprising a second, distinct, set of one or more nodes within the plurality of nodes of the object graph;
   assigning a first permission to the first permission partition of the object graph so that the first permission is enforced on access requests for objects within the first permission partition, and the first permission representing that there are no external references to a root permission partition referenced by a return reference; and
   providing an instantiation component which assigns permissions to each permission partition, so that the permissions assigned to the first and second permission partitions of the type are independent and instantiations of the type can have a different permission for the second permission partition than the first permission partition.

2. The computer program product in accordance with claim 1, wherein the declaration of the type also specifies a minimum permission restriction associated with at least one of the first permission partition and the second permission partition.

3. The computer program product in accordance with claim 2, wherein the minimum permission restriction is an immutable permission.

4. The computer program product in accordance with claim 2, wherein the minimum permission restriction is a readable permission.

5. The computer program product in accordance with claim 2, wherein the minimum permission restriction is a writable permission.

6. The computer program product in accordance with claim 1, wherein the first permission partition is a root permission partition, and the second permission partition is an inner permission partition.

7. The computer program product in accordance with claim 1, wherein the method further comprises: an act of defining a third permission partition within the type so that instantiations of the type are permitted to have a different permission for the third permission partition than the first permission partition or the second permission partition.

8. A computer implemented method for instantiating an object graph representing an instance of a particular type that has structured permissions, the method comprising:
   representing, by a processor, a type as an object graph, the object graph comprising a plurality of nodes, the object graph supporting structured permissions, the structured permissions comprising a plurality of distinct permissions including a fresh permission, a fresh shallow permission, a deep permission, a root permission, and an inner permission;
   defining a first permission partition within the type, the first permission partition comprising a first set of one or more nodes within the plurality of nodes of the object graph;
   defining a second permission partition within the type, the second permission partition comprising a second, distinct, set of one or more nodes within the plurality of nodes of the object graph;
   assigning a first permission to the first permission partition of the object graph so that the first permission is enforced on access requests for objects within the first permission partition, and the first permission representing that there are no external references to a root permission partition referenced by a return reference; and
   assigning a second permission to the second permission partition of the object graph so that the second permission is enforced on access requests for objects within the second permission partition, wherein assignment of the first and second permissions are independent and the second permission can be different than the first permission.

9. The method in accordance with claim 8, wherein the first permission is the same as the second permission.

10. The method in accordance with claim 8, wherein the first permission is different than the second permission.

11. The method in accordance with claim 10, wherein the first permission partition is a root permission partition, and the second permission partition is an inner permission partition.

12. The method in accordance with claim 11, wherein the first permission partition is a shallow fresh permission, further representing that there are no mutable references within the root permission partition to any objects outside of the root permission partition.

13. The method in accordance with claim 8, wherein the first permission is an immutable permission.

14. The method in accordance with claim 8, further comprising converting the object graph into an object graph in which either or both of the first permission and the second permission are more restrictive.

15. The method in accordance with claim 8, wherein the first permission is a readable permission.

16. The method in accordance with claim 8, wherein the first permission is a writable permission.

17. The method in accordance with claim 8, wherein the object graph is a first object graph of the particular type, the method further comprising: an act of assigning a third permission to the first permission partition of a second object graph of the particular type so that the third permission is enforced on access requests for objects within the first permission partition of the second object graph; and an act of assigning a fourth permission to the second permission partition of the second object graph so that the fourth permission is enforced on access requests for objects within the second permission partition, wherein the fourth permission can be different than the first permission.

18. The method in accordance with claim 17, wherein the third permission is different than the first permission.

19. The method in accordance with claim 18, wherein the fourth permission is different than the second permission.

20. A system for instantiating an object graph representing an instance of a particular type that has structured permissions, the system comprising one or more computer processors and system memory in which are instantiated:

a type definition access component that accesses a type definition of a particular type, the type definition comprising a plurality of distinct permissions, the type being represented as an object graph, the object graph comprising a plurality of nodes, the object graph supporting structured permissions comprising a plurality of distinct permissions including a fresh permission, a fresh shallow permission, a deep permission, a root permission, and an inner permission, the type definition specifying a first permission partition within the type and a second permission partition within the type, the first permission partition comprising a first set of one or more nodes within the plurality of nodes of the object graph and the second permission partition comprising a second, distinct, set of one or more nodes within the plurality of nodes of the object graph, wherein a permission assigned to the first permission partition can be different than a permission assigned to the second permission partition; and an instantiation component configured to:

generate the object graph of the particular type using the type definition, assign a first permission to the first permission partition of the object graph, the first permission representing that there are no external references to a root permission partition referenced by a return reference, and assign a second permission to the second permission partition of the object graph, wherein the second permission is different than the first permission.

\* \* \* \* \*